(12) United States Patent
Ebert

(10) Patent No.: US 8,146,223 B2
(45) Date of Patent: Apr. 3, 2012

(54) FIXTURE FOR REPLACING VEHICLE AXLE BRAKE SPIDERS

(76) Inventor: James L. Ebert, Huron, OH (US)

( * ) Notice: Subject to any disclaimer, the term of this patent is extended or adjusted under 35 U.S.C. 154(b) by 1831 days.

(21) Appl. No.: 11/342,965

(22) Filed: Jan. 30, 2006

(65) Prior Publication Data

US 2006/0170279 A1    Aug. 3, 2006

Related U.S. Application Data

(60) Provisional application No. 60/650,748, filed on Feb. 1, 2005.

(51) Int. Cl.
*B25B 11/00* (2006.01)

(52) U.S. Cl. .......................... 29/281.1; 29/255; 29/263

(58) Field of Classification Search .................. 29/281.1, 29/255, 256–263
See application file for complete search history.

(56) References Cited

U.S. PATENT DOCUMENTS

| | | | |
|---|---|---|---|
| 1,268,285 A * | 6/1918 | Schilling .......................... | 29/259 |
| 4,455,732 A | 6/1984 | Shiets | |
| 4,467,955 A | 8/1984 | Maupin, Jr. | |
| 4,571,795 A | 2/1986 | Shiets | |
| 4,792,080 A | 12/1988 | Ferrari | |
| 5,125,146 A | 6/1992 | Ferrari | |
| 5,557,833 A * | 9/1996 | Pool ................................ | 29/261 |
| 5,727,778 A * | 3/1998 | Nodar .............................. | 269/43 |
| 5,966,812 A | 10/1999 | Shiets | |
| 6,024,418 A | 2/2000 | Ebert | |
| 6,068,091 A | 5/2000 | Finley | |
| 7,216,409 B1 * | 5/2007 | Chiu et al. ....................... | 29/259 |
| 7,322,087 B1 * | 1/2008 | Hu et al. .......................... | 29/261 |
| 7,386,926 B2 * | 6/2008 | Bosche et al. ................... | 29/227 |
| 7,669,306 B2 * | 3/2010 | Palka .............................. | 29/261 |
| 7,698,795 B2 * | 4/2010 | Brock et al. ..................... | 29/274 |
| 2004/0205963 A1 * | 10/2004 | Rubino et al. ................... | 29/762 |
| 2006/0170279 A1 * | 8/2006 | Ebert .............................. | 301/130 |

* cited by examiner

*Primary Examiner* — Lee D Wilson
(74) *Attorney, Agent, or Firm* — David D. Murray; Vivacqua Law, PLLC

(57) ABSTRACT

A fixture for replacing brake spiders on heavy duty vehicle and truck axles includes an assembly with a flat reference surface and two internal bores just slightly larger than the respective inner and outer bearing surfaces on the axle having a damaged brake spider. The fixture may have specifically sized bores or may include a plurality of collars which can be utilized in pairs and mounted and retained within the fixture. The fixture also includes longitudinally adjustable rods or fingers extending therefrom which include blind threaded bores. During attachment of the new brake spider, threaded fasteners are inserted into the blind bores to temporarily and properly position the brake spider on the fixture and axle.

20 Claims, 12 Drawing Sheets

FIXTURE FOR REPLACING VEHICLE AXLE BRAKE SPIDERS

CROSS-REFERENCE TO RELATED APPLICATION

The present invention claims priority to U.S. Provisional Patent Application Ser. No. 60/650,748, filed Feb. 1, 2005 and entitled "Fixture and Method for Repairing Motor Vehicle Axle Brake Spiders."

BACKGROUND OF THE INVENTION

The invention relates generally to fixtures and methods for repairing components of motor vehicle axles and more specifically to a fixture and method for replacing brake spiders on axles of heavy duty motor vehicles such as trucks and trailers.

Long haul and cross-country tractors and trailers readily log tens of thousands of miles a year. Given such arduous service, it is understandable that the mechanical components of the trailer such as the tires, wheel bearings and brake assemblies are subject to wear and failure. Wheel bearing and brake failures tend to be the result of extended use although brake failures may also result from a relatively small number of incidents wherein the brakes have overheated and the brake spiders have warped or cracked. The spider is a generally oblong metal plate which is secured transversely near the terminus of the axle and to which the brake components are secured. Once the spider becomes damaged, the brake shoes or other components will no longer be held in their correct positions, braking may be compromised and the brake drums will eventually be damaged. The heretofore accepted solution, when a brake spider was damaged, was to replace the entire axle which was a costly and time consuming approach. The present invention relates to a brake spider fixture and method of replacing a damaged brake spider which avoids the expense and time of axle replacement.

SUMMARY OF THE INVENTION

A fixture and method for replacing brake spiders on heavy duty vehicle and truck axles includes fixture having an assembly with a flat reference surface and two internal bores just slightly larger than the respective inner and outer bearing surfaces on the axle having a damaged brake spider. The fixture also includes longitudinally oriented and moveable guides, rods or fingers which can be secured to the assembly. The method comprises the steps of determining a reference distance between a feature of the axle such as a shoulder adjacent an inner bearing surface and the brake spider which may be facilitated by positioning the fixture on the vehicle axle. The damaged spider is removed from the axle with, for example, an oxy-acetylene torch. Next, a new spider is temporarily attached to the rods or fingers which are adjusted to locate the replacement spider at the previously determined reference distance. The fixture and the spider are then placed on the axle with the fixture against the axle shoulder. The spider is then tack welded to the axle, the fixture is removed and the spider is securely welded to the axle. The brake components may then be reassembled to the spider.

Thus it is an object of the present invention to provide a fixture for facilitating the replacement of brake spiders on axles of heavy duty vehicles such as trucks and trailers.

It is a further object of the present invention to provide a method for replacing brake spiders on axles of heavy duty vehicles such as trucks and trailers.

Further objects and advantages of the present invention will become apparent by reference to the following description of the preferred embodiment and appended drawings wherein like reference numbers refer to the same component, element or feature.

DESCRIPTION OF THE PREFERRED AND ALTERNATE EMBODIMENTS

Figure 1:
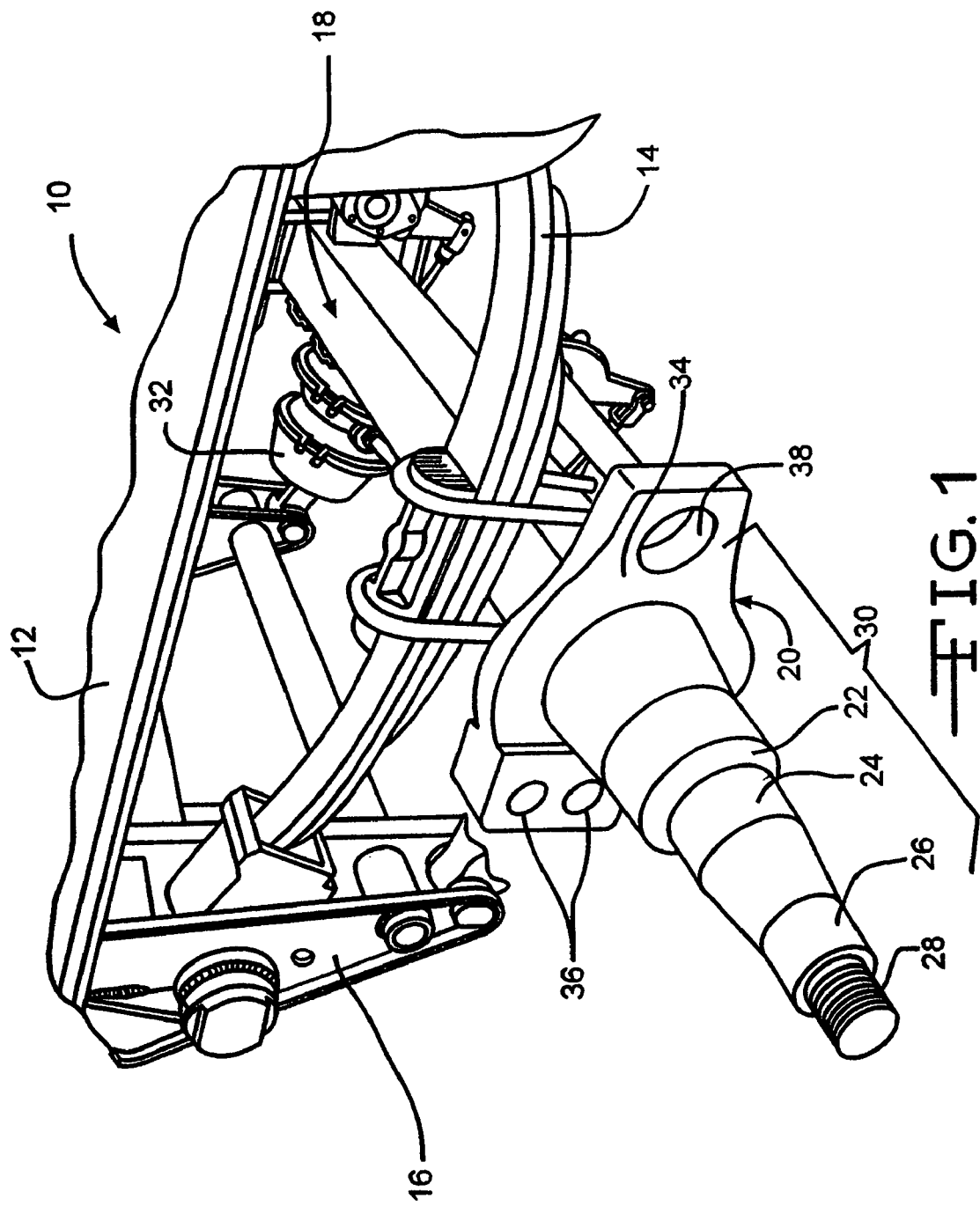
FIG. 1 is a fragmentary, perspective view of a portion of a vehicle (trailer) suspension and axle having a damaged brake spider.

Referring now to FIG. 1, a portion of a heavy duty vehicle such as a truck trailer is illustrated and generally designated by the reference number 10. The trailer 10 includes a body 12 and suspension components such as a leaf spring 14, appropriate attachment structures 16 for the leaf spring 14 and an axle assembly 18 having a brake spider 20, a shoulder 22 and an inner bearing surface 24, an outer bearing surface 26 and a threaded terminal portion 28 which comprise a terminal portion or spindle 30 of the axle assembly 18.

Secured to the axle assembly 18 and associated with the brake spider 20 may be various air brake components 32 which form no portion of the present invention. The brake spider 20 defines an irregularly shaped flange 34 typically including a pair of adjacent through apertures 36 generally disposed on one side of the axle assembly 18 for attachment of a pair of brake shoes (not illustrated) and a single larger through aperture 38 on the opposite side of the axle assembly 18 for receiving an actuator linkage (also not illustrated) associated with the air brake components 32 which actuates the brake shoes.

It should be appreciated that due to various factors, which frequently may be simply the extended service life of the trailer 10 and axle assembly 18, the brake spider 20 may have suffered dimensional distortion, wearing away or damage such as cracking which renders it unfit for use and necessitates its replacement.

Figure 2:
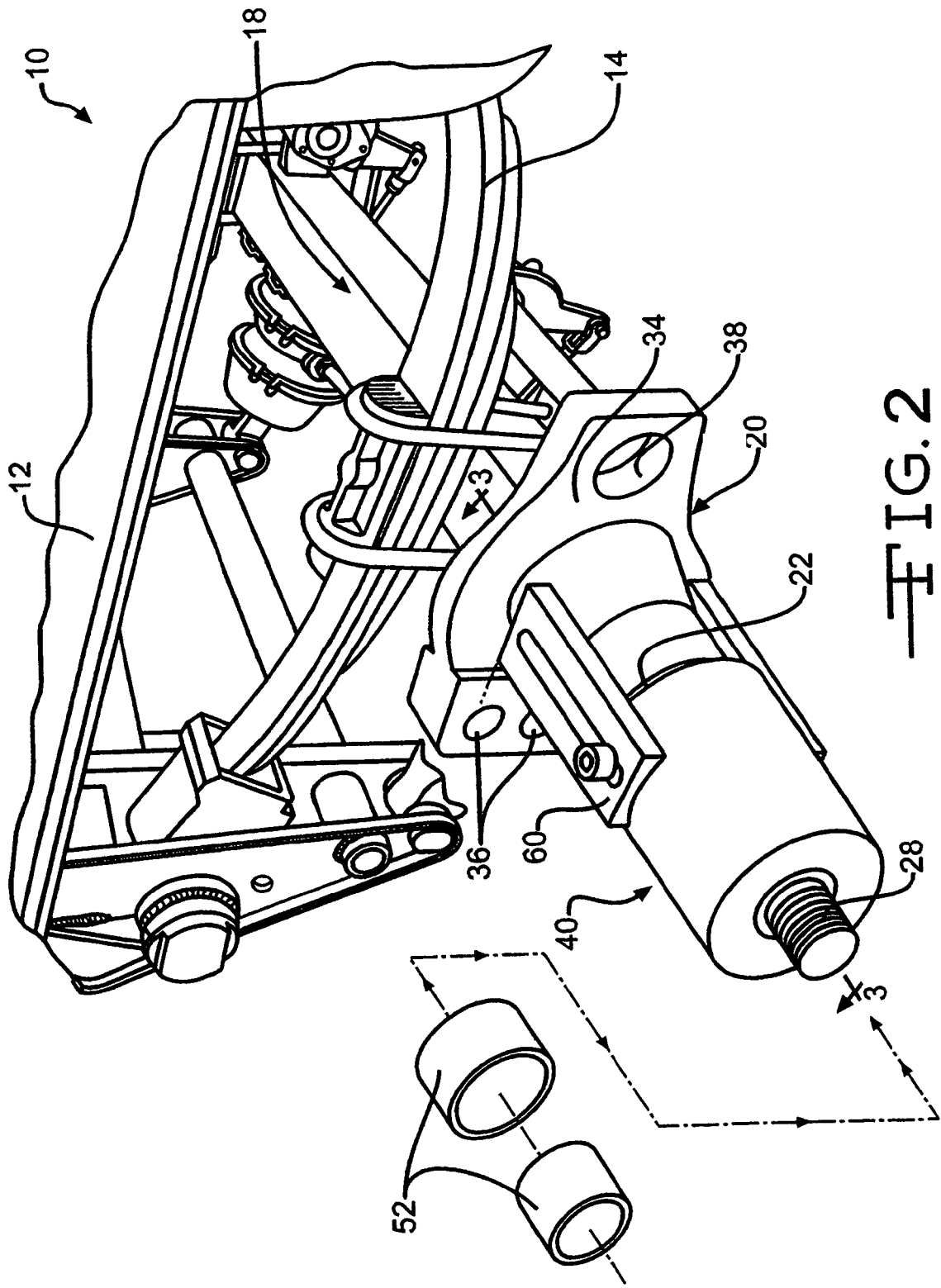
FIG. 2 is a fragmentary, perspective view of a vehicle (trailer) suspension with a fixture according to the present invention in place upon the axle.
Figure 3:
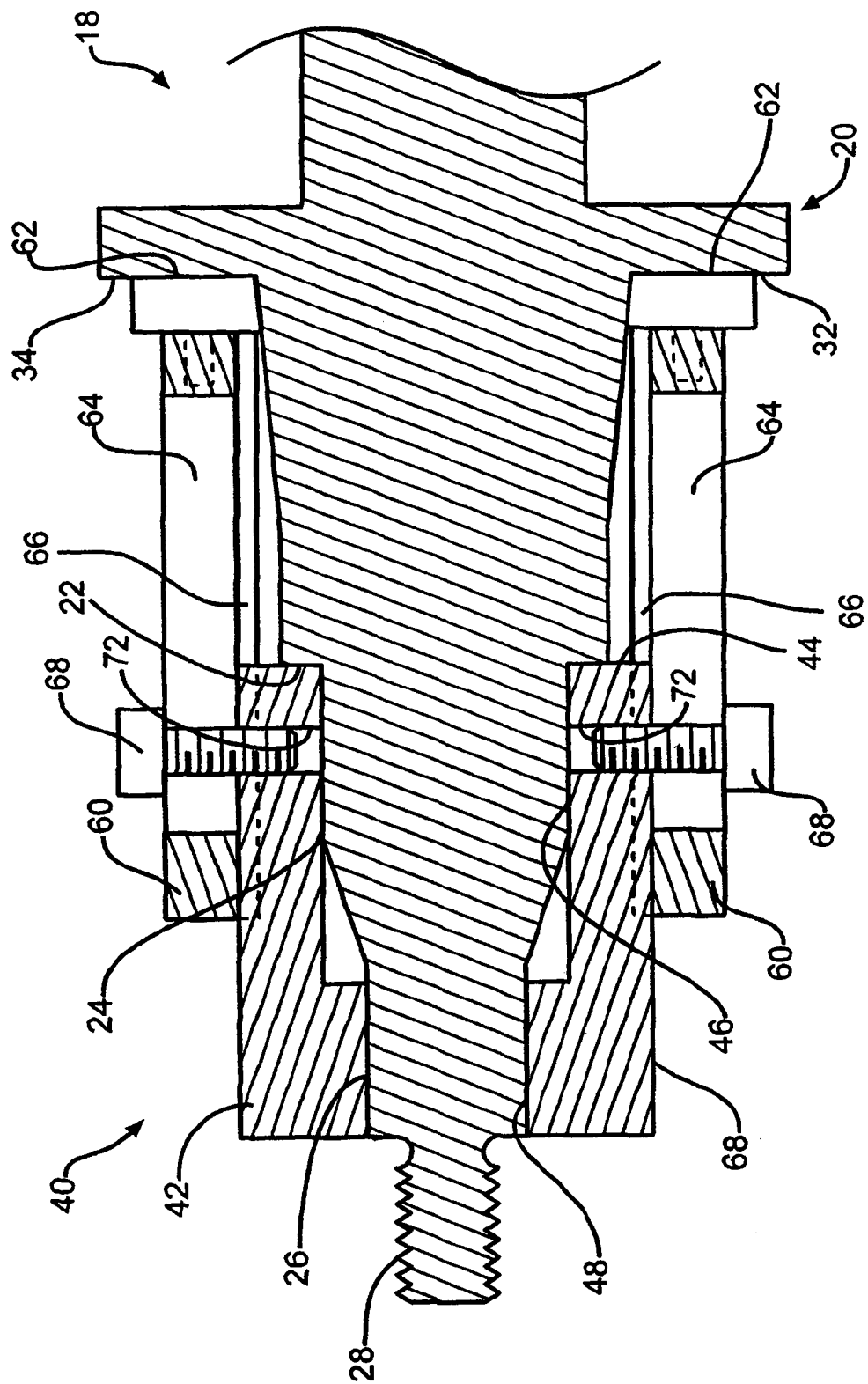
FIG. 3 is a full, sectional view of a fixture according to the present invention in place on a vehicle (trailer) axle taken along line 3-3 of FIG. 2.

Referring now to FIGS. 2 and 3, in order to facilitate replacement of the damaged brake spider 20, a spider replacement fixture 40 may be disposed upon the terminal portion 30 of the axle assembly 18. The fixture 40 includes a tubular or cylindrical collar 42 defining a reference axis and having a flat end or front surface 44 perpendicular to the reference axis. The cylindrical collar 42 defines a first inside region or bore 46 having a first diameter which is preferably just slightly larger than the outside diameter of the inner bearing surface 24. The cylindrical collar 42 also defines a reduced diameter region or second bore 48 adjacent the end opposite the first bore 46 which is just slightly larger than the diameter of the outer bearing surface 26. The first bore 46 and the second bore 48 are preferably separated by an axial distance equal to or slightly greater than the distance between the inner bearing surface 24 and the outer bearing surface 26 of the spindle 30 of the axle assembly 18.

So sized and configured, the cylindrical collar 42 slides onto and locates about the inner bearing surface 24 and the outer bearing surface 26 of the axle assembly 18. Thus, the cylindrical collar 42 of the fixture 40 is located by both the inner bearing surface 24 and outer bearing surface 26 of the spindle 30 in order to ensure that the reference axis of the fixture 40 is coincident with the axis of the spindle 30 of the axle assembly 18.

It will be understood that various axles and axle assemblies will define various inner and outer bearing surface diameters as well as axial spacings there-between. In certain axles, the diameters of the bearing surfaces will be the same. In order to accommodate these variations, it is necessary to either employ specific cylindrical collars 42 with appropriate inner diameters and axial spacings or utilize one or two annular sleeves, such as the representative sleeves 52 illustrated, having outside diameters just slightly less than the corresponding inside diameters of the collar 42 and inside diameters just slightly larger than the diameters of the bearing surfaces 24 and 26. Such sleeves 52 may be utilized as needed to adapt a given cylindrical collar 42 to a specific configuration of a spindle 30.

A pair of adjustable elongate fingers or slides 60 each define flat end faces or surfaces 62 and an elongate interior slot 64. The elongate fingers or slides 60 each also define inner curved surfaces 66 which are complementary to an outer curved surface 68 of the cylindrical collar 42. Cooperation between the inner and outer curved surfaces 66 and 68 maintains the fingers or slides 60 aligned with the reference axis of the cylindrical collar 42.

While the cylindrical collar 42 is in place on the bearing surfaces 24 and 26 and the front surface 44 is in contact with the shoulder 22 of the axle assembly 18, the adjustable fingers or slides 60 are adjusted to align with front surfaces of the damaged brake spider 20 such as undamaged surfaces adjacent the apertures 36 and 38. One of a pair of threaded bolts or set screws 68 engages each of the slides 60, is received within the respective elongate slot 64 and is threadably received into a respective one of a pair of complementarily threaded bores 72 arranged in diametric opposition in the cylindrical collar 42. When the end faces 62 of the slides 60 are aligned with the reference, undamaged surfaces of the brake spider 20 and the front surface 44 of the cylindrical collar 42 is in contact with the shoulder 22 of the axle assembly 18, the set screws 68 are tightened in order to maintain the distance between the front surface 44 of the collar 42 and the end faces 62 of the slides 60. The fixture 40 is then removed from the axle assembly 18. Alternatively, any measurement apparatus and technique which measures the axial distance between the shoulder 22 or other feature of the axle assembly 12 and reference surfaces of the brake spider 20, may be utilized.

Figure 4:
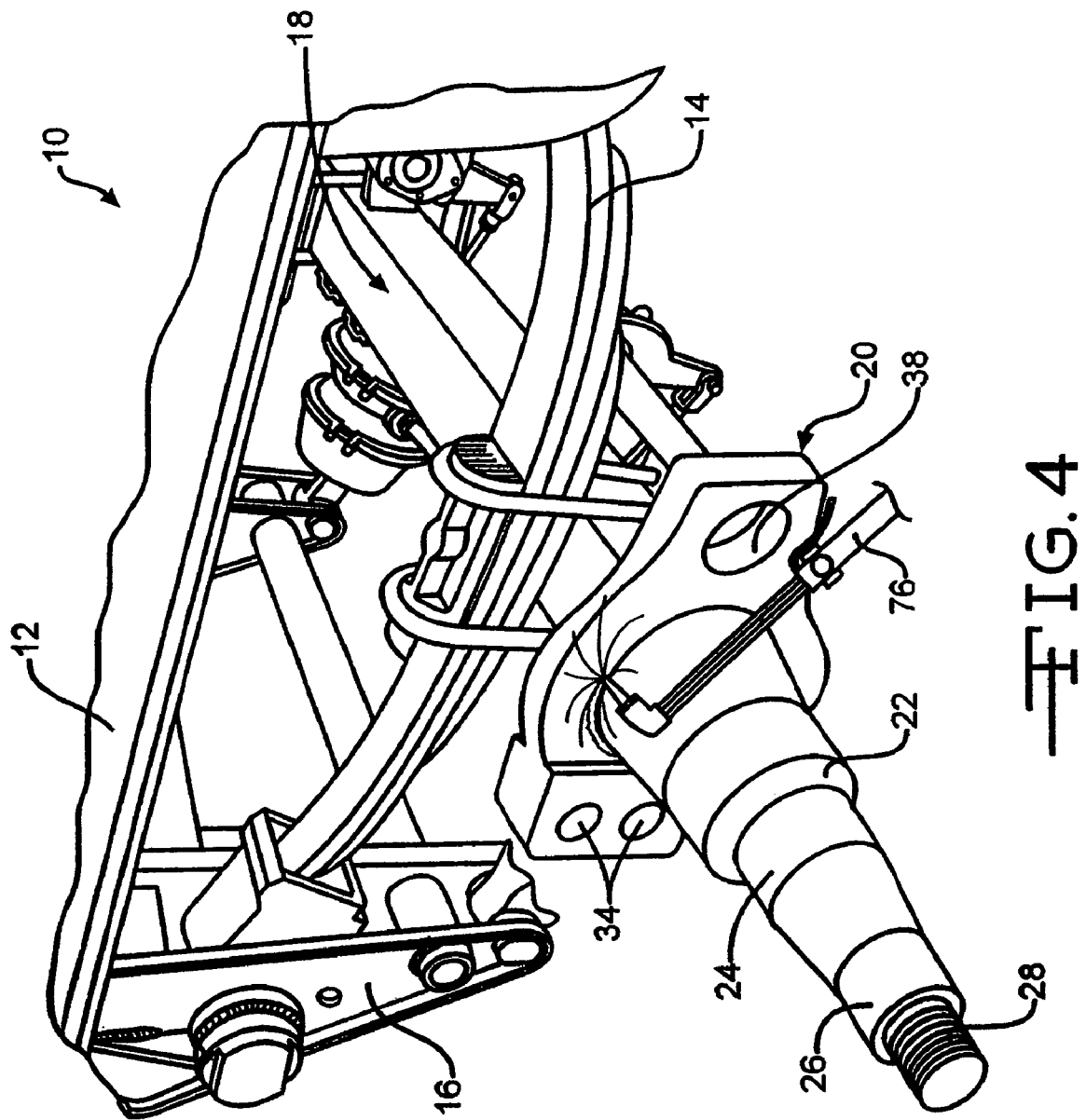
FIG. 4 is a fragmentary, perspective view of a vehicle (trailer) suspension illustrating cutting of the damaged brake spider.

Turning now to FIG. 4, the damaged brake spider 20 is next removed from the axle assembly 18 by any suitable means. A preferable method has been found to be employment of an oxy-acetylene torch 76. In conventional fashion, the oxy-acetylene torch 76 is utilized to first heat the damaged brake spider 20 generally proximate the region of merger with the axle assembly 18 and then to apply a jet of oxygen to the heated portion to burn it away. Other methods suitable for cutting through the metal of a motor vehicle axle while it is in place on the vehicle, i.e., in-situ, such as sawing with a metal saw as well as other well known and conventional methods may also be employed.

Figure 5:
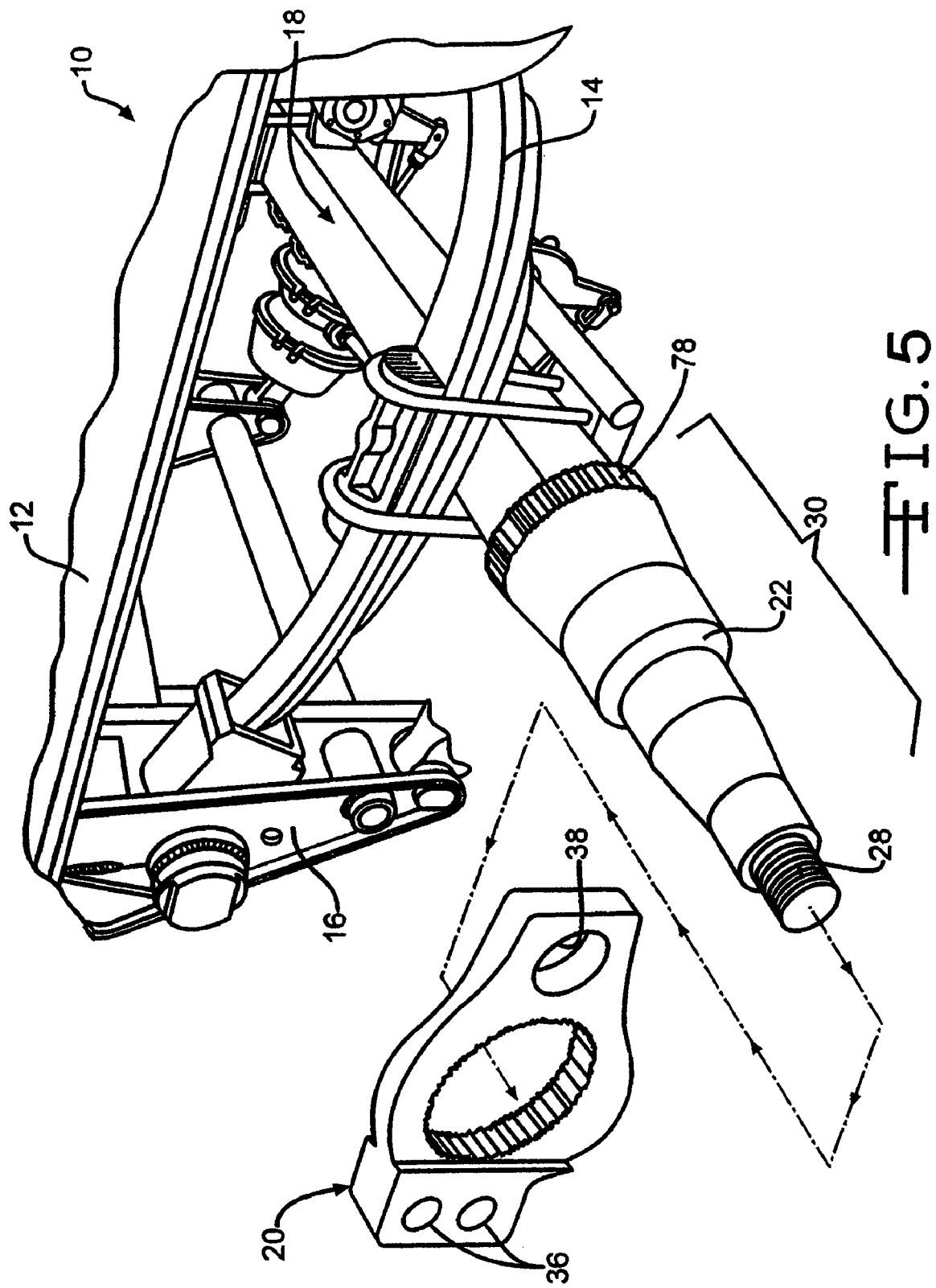
FIG. 5 is a fragmentary, perspective view of a vehicle (trailer) suspension illustrating removal of the damaged brake spider and preparation of the vehicle (trailer) axle for installation of a replacement brake spider.

Referring to FIG. 5, the damaged brake spider 20 is removed by sliding it off the terminal portion 30 of the axle assembly 18. The region 78 of the axle assembly 18 from which the brake spider 20 has been removed may have burrs and irregularities removed by grinding such that the region 78 is generally circular and relatively smooth in order to facilitate installation of a new replacement brake spider 20A thereupon.

Figure 6:
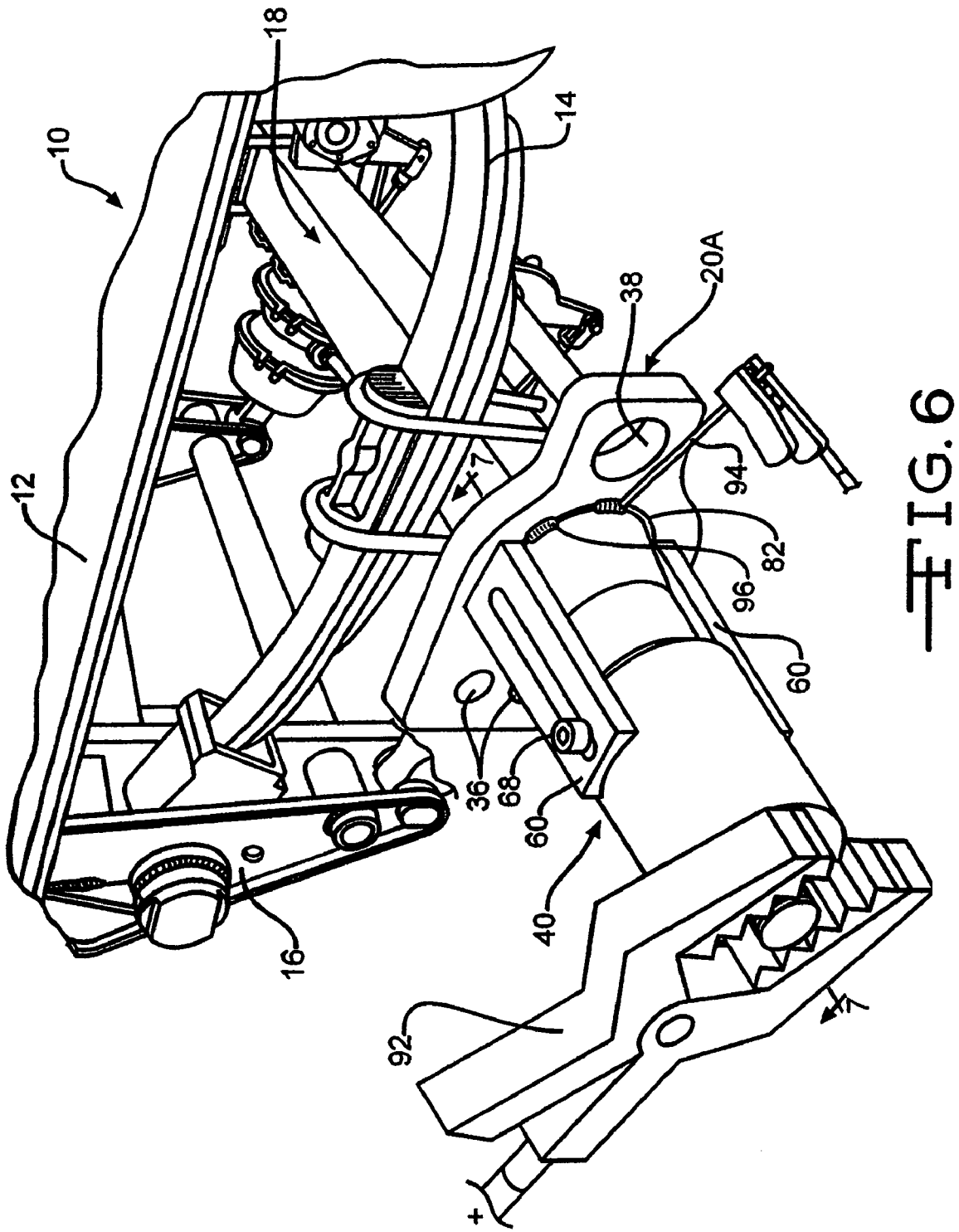
FIG. 6 is a fragmentary, perspective view of a vehicle (trailer) suspension illustrating locating a replacement brake spider upon a vehicle axle with the fixture according to the present invention and tack welding of the brake spider onto the vehicle axle.
Figure 7:
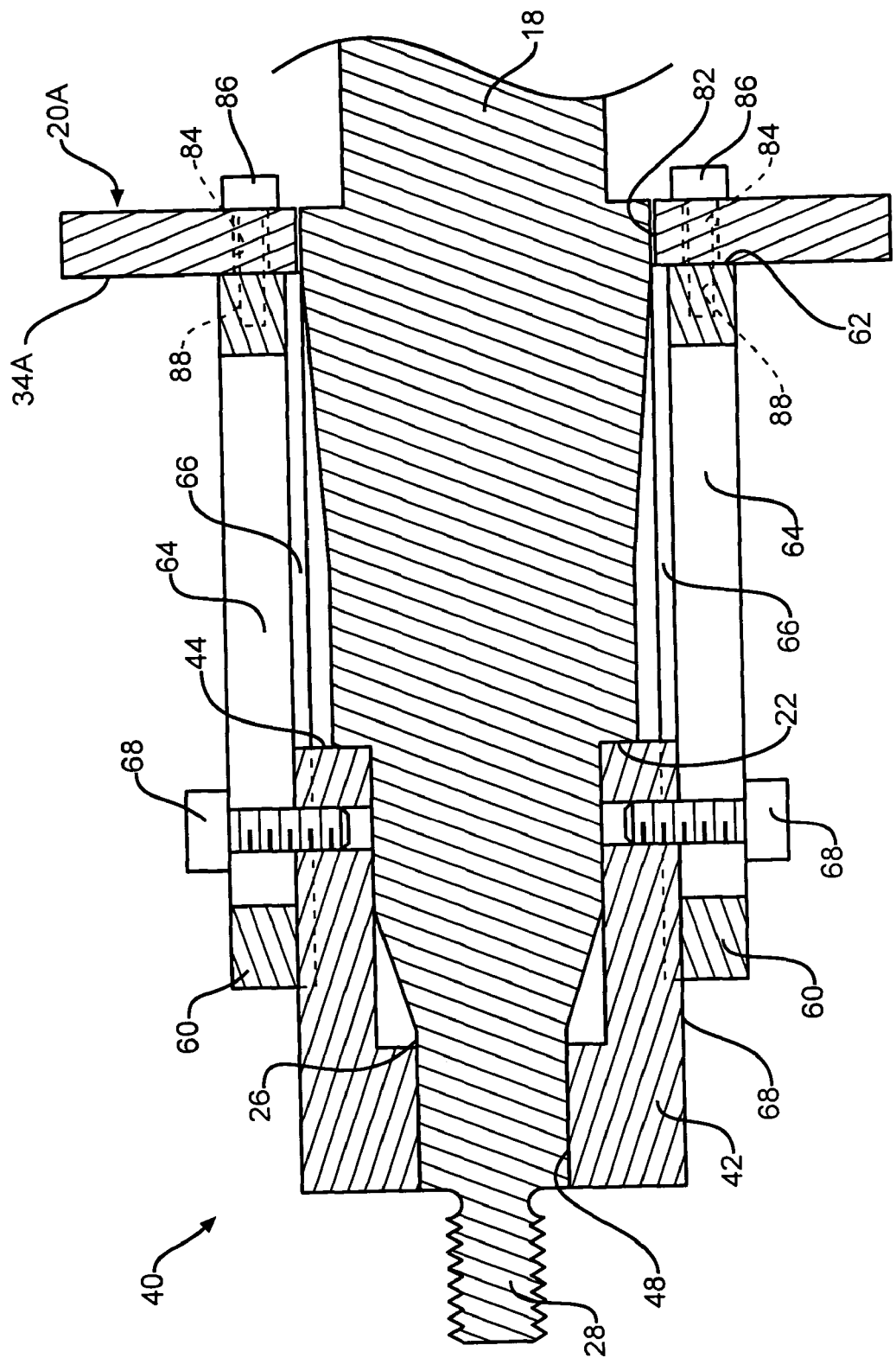
FIG. 7 is a full, sectional view of a fixture according to the present invention and the replacement brake spider in place on a vehicle (trailer) axle taken along line 7-7 of FIG. 6.

Referring now to FIGS. 6 and 7, the damaged brake spider 20 is replaced with a new brake spider 20A having a configuration and dimensions essentially identical to the damaged spider 20 removed from the axle assembly 18. As such, it includes a machined surface 34A, the pair of attachment through apertures 36 and the single larger through aperture 38. It, of course, includes a large, centrally disposed aperture 82 which receives the terminal portion 30 of the axle assembly 18. It also includes a plurality, preferably four, small through bores or apertures 84 arranged around the large, centrally disposed aperture 82.

The fixture 40 is first secured to the machined surface 34A of the replacement spider 20A through the use of pairs of threaded fasteners 86 which extend through the small through apertures 84 in the replacement spider 20A and are received within two complementarily threaded blind bores or apertures 88 formed in each of the ends of the slides 60. The fixture 40 is then repositioned upon the axle assembly 18 with the end surface 44 of the cylindrical collar 42 disposed in intimate contact with the shoulder 22 of the axle assembly 18. If necessary, the set screws 68 may be loosened and the replacement spider 20A may be moved axially along the axle assembly 18 to ensure that the replacement spider 20A is located exactly as the original spider 20 was. It will be appreciated that the fixture 40 facilitates orientation of the replacement spider 20A perpendicular to the axle assembly 18. As illustrated in FIG. 6, the replacement spider 20A may now be tack welded to the axle assembly 18, preferably by electric arc welding with an electrically conducting clamp 92 and a suitable welding rod 94 and associated arc welding power supply (not illustrated). Several tack welds 96 will preferably be made.

Figure 8:
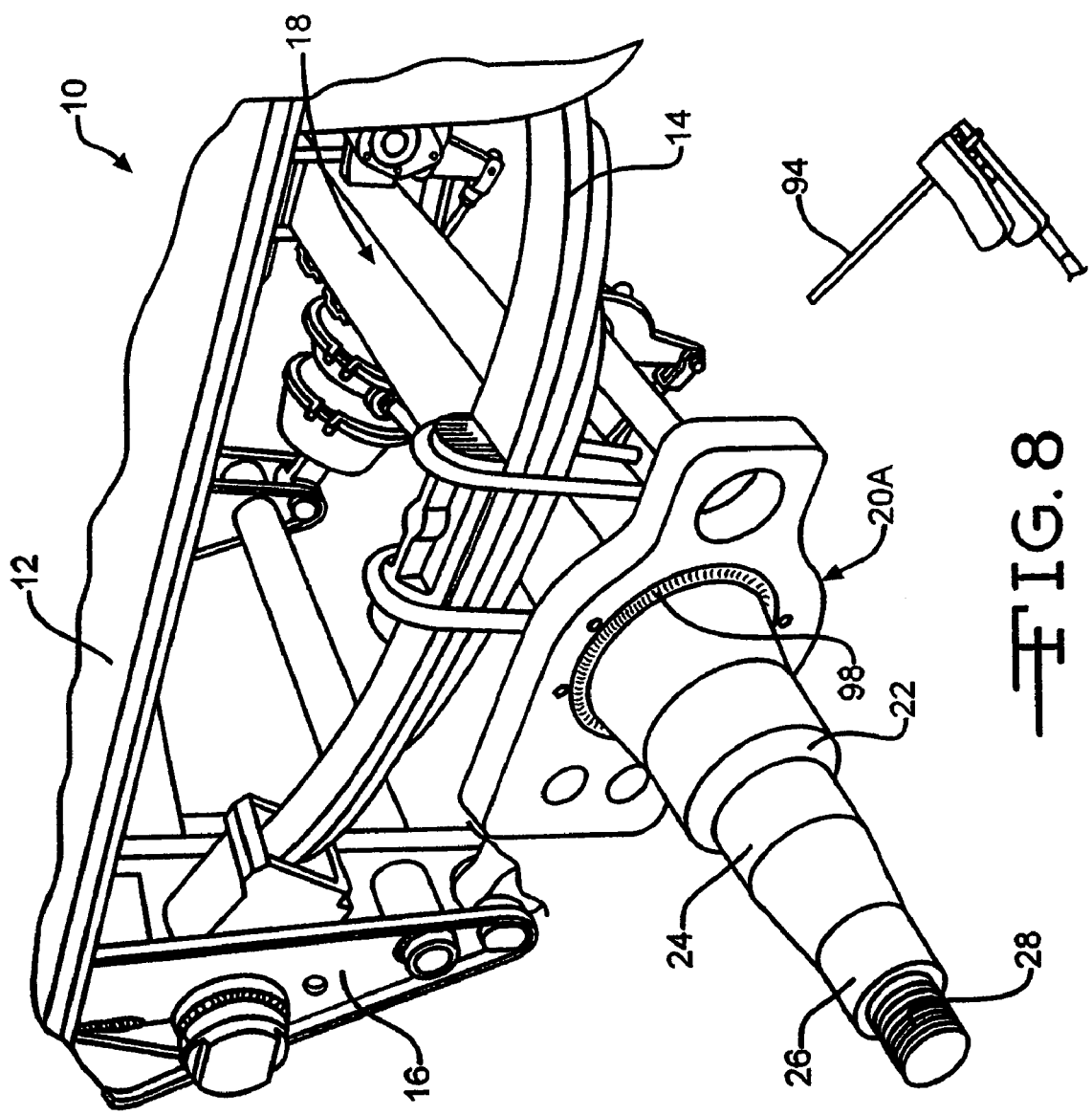
FIG. 8 is a fragmentary, perspective view of a vehicle (trailer) suspension and axle illustrating completed welding of the replacement brake spider to the axle.

Finally, turning to FIG. 8, the fixture 40 is removed by removal of the threaded fasteners 86 and sliding the fixture 40 off the spindle 30 of the axle assembly 18. The replacement spider 20A may now be securely and completely attached to the axle assembly 18 by continuous front and back welds 98 by arc welding with the welding rod 94. Upon inspection of the welds 98 to assure their quality and strength, the brake shoes (not illustrated) and associated actuating linkage (also not illustrated) may be re-installed on the replacement spider 20A.

Preferably, the fixture 40 and specifically the cylindrical collar 42 and the slides 60 are fabricated of aluminum which has first been hard anodized and then coated with a fluoropolymer resin such as Teflon. Teflon is a registered trademark of the E.I. DuPont deNemours Co. Aluminum renders the fixture 40 lightweight, hard anodizing improves its appearance and increases the surface hardness of the metal and a coating of Teflon or a similar material greatly improves rejection and release of weld splatter.

Figure 9:
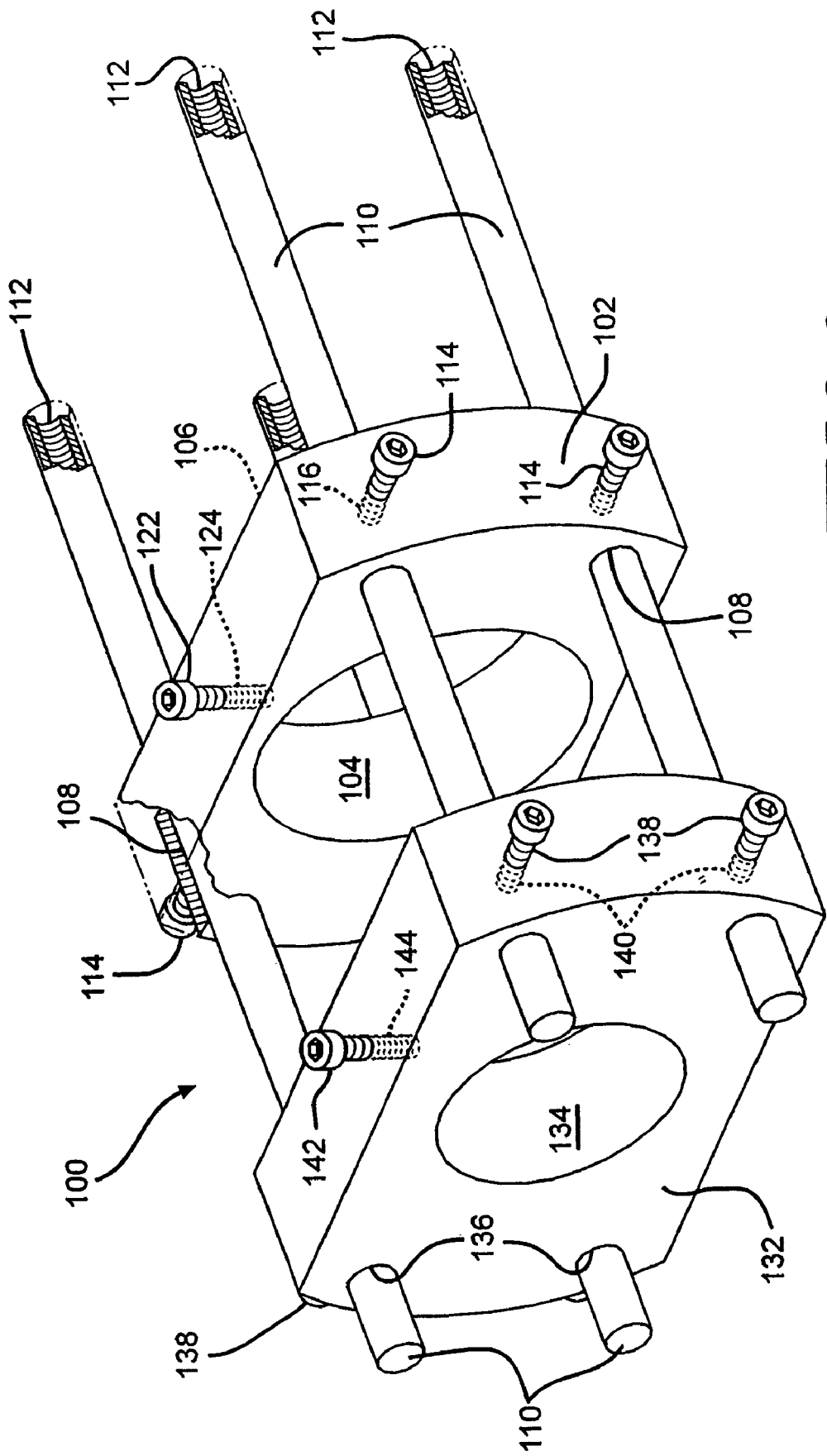
FIG. 9 is a perspective view of a preferred embodiment spider replacement fixture according to the present invention.

FIG. 9 illustrates a preferred embodiment spider replacement fixture 100. The spider replacement fixture 100 includes a first block or collar 102 defining a centrally disposed circular aperture 104. The first block or collar 102 also defines a flat surface or face 106 which is perpendicular to the axis of the center aperture 104. A plurality, preferably four, smaller through apertures 108 slidingly receive a like plurality of elongate, cylindrical guides or rods 110. The ends of the elongate guides or rods 110 most distant the spider replacement fixture 100 and generally proximate the surface or face 106 of the first collar 102 each include blind threaded apertures 112. The elongate cylindrical rods 110 may be fixed in a desired position relative to the first block or collar 102 by tightening a respective one of a plurality of set screws 114 which are received within suitably threaded apertures 116 which intersect the through apertures 108 which receive the elongate rods 110. A fifth set screw 122 extends through a threaded aperture 124 into the central aperture 104. The fifth set screw 122 may be utilized to releasably secure the first block or collar 102 to a vehicle axle (illustrated in FIG. 10).

The spider replacement fixture 100 also includes a second block or collar 132 which defines a typically smaller, centrally disposed circular aperture 134. The size of the smaller circular aperture 134 is, of course, dictated by the size of the outer bearing surface 26 on the axle assembly 18 with which the fixture 100 will be used. Thus, as noted above, the diameter of the circular aperture 134 may also be the same as the diameter of the circular aperture 104 of the first collar 102. The second block or collar 132 also includes a plurality of four smaller through apertures 136 which slidingly receive the elongate, cylindrical rods 110.

It will be appreciated that the axes of the four through apertures 136 in the second block or collar 132 are arranged and aligned with the axes of the through apertures 108 in the first block or collar 102 such that the elongate rods 110 may readily slide through both collars 102 and 132 and the two collars 102 and 132 may be slid proximate one another on the elongate rods 110 or moved apart as illustrated in FIG. 9. Similarly, the axes of the centrally disposed openings 104 and 134 are coaxial when the elongate rods 110 and collars 132 and 134 are generally arranged as illustrated in FIG. 9. A plurality of set screws 138 are received within threaded openings 140 in the second block or collar 132 and intersect the apertures 136 and cylindrical rods 110 and thereby permit securement and release of the elongate rods 110 in the second block or collar 132. A fifth set screw 142 is disposed in a threaded aperture 144 which intersects the circular opening 134 facilitates securement of the second block or collar 132 to a vehicle axle (illustrated in FIG. 10) when the set screw 142 is tightened.

Preferably, the collars 102 and 132 are fabricated of aluminum which has been hard anodized and then coated with a fluoropolymer resin such as Teflon. The elongate rods 110 are preferably good quality cold rolled steel.

Figure 10:
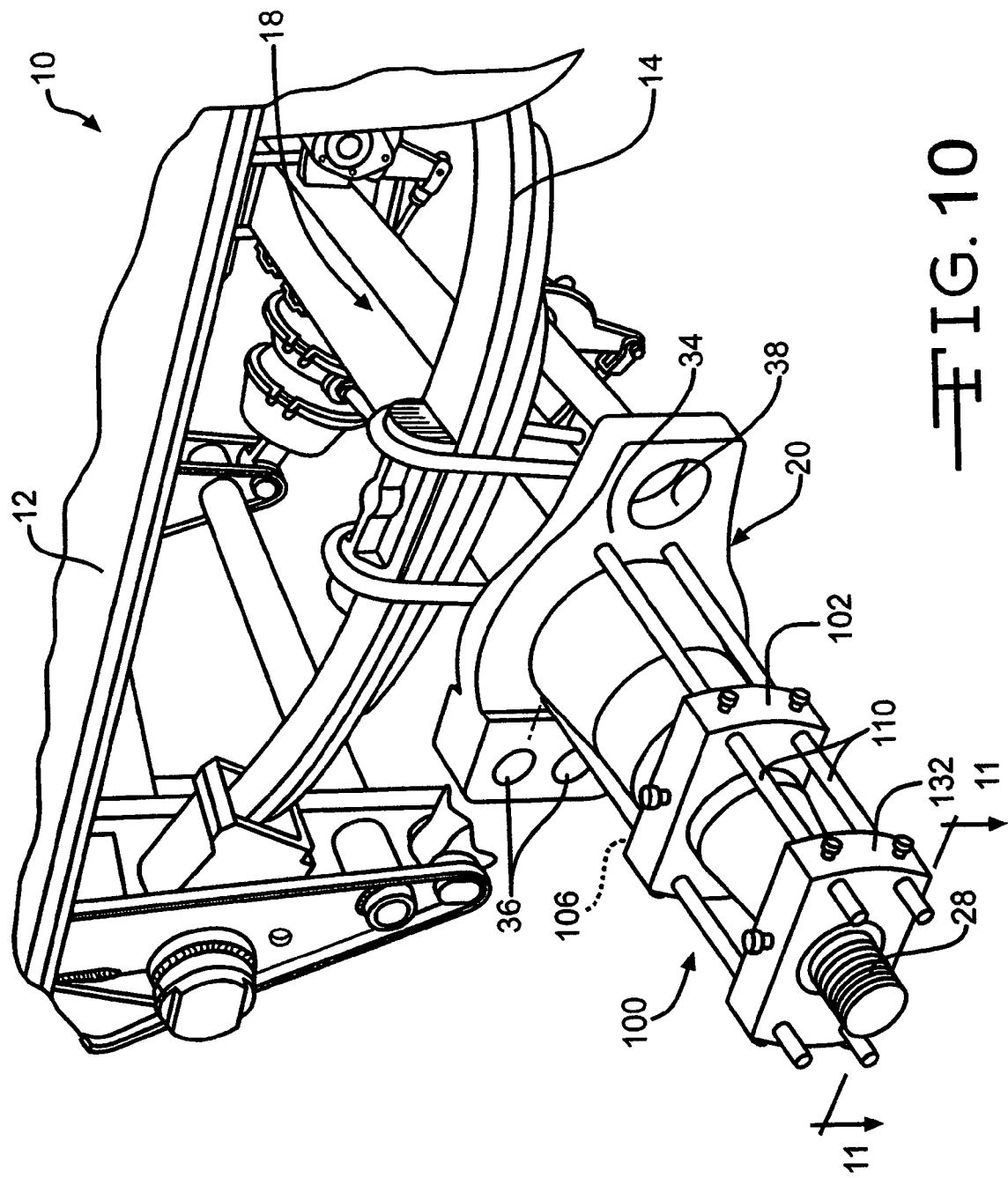
FIG. 10 is a fragmentary, perspective view of a vehicle (trailer) suspension with a preferred embodiment fixture according to the present invention in place upon the axle.
Figure 11:
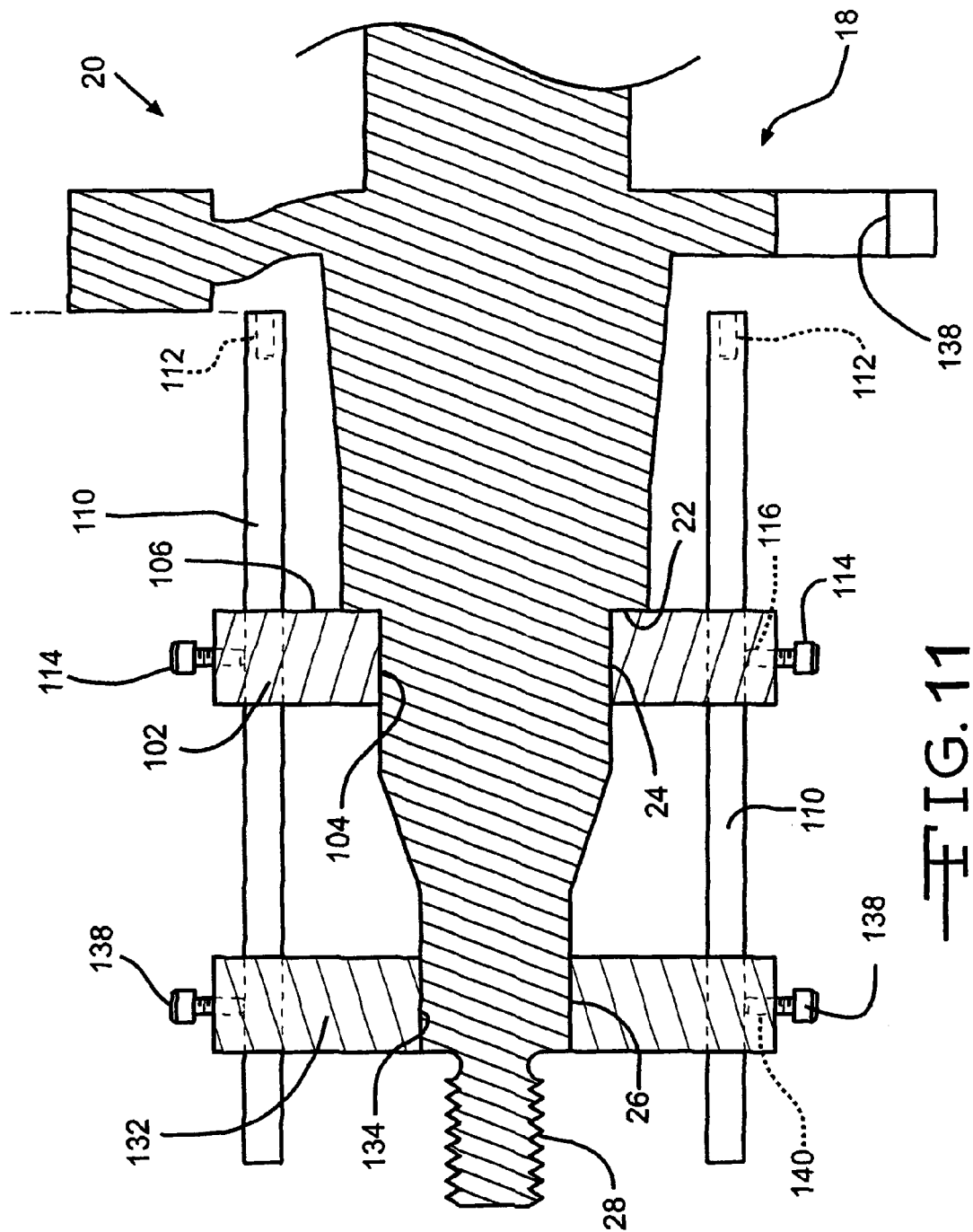
FIG. 11 is a full, sectional view of a preferred embodiment fixture according to the present invention in place on a vehicle (trailer) axle taken along line 11-11 of FIG. 10.

Referring now to FIGS. 9, 10 and 11, a method of replacing a vehicle axle brake spider utilizing the preferred embodiment spider replacement fixture 100 will now be described, with those steps that are the same as the previous method being described only briefly and with reference to the previous figures and accompanying text.

In FIGS. 10 and 11, the spider replacement fixture 100 is illustrated in place upon a vehicle axle assembly 18 of a trailer 10 having a body 12 and a leaf spring 14. The brake spider 20 defines an irregularly shaped flange having through apertures 36 and 38. Specifically, the face 106 of the first block or collar 102 is disposed in intimate contact with the shoulder 22 of the axle assembly 18. So disposed, the aperture 104 of the first block or collar 102 engages and is centered upon the inner bearing surface 24. The second block or collar 132 is similarly arranged with its centrally disposed aperture 134 engaging and centered upon the outer bearing surface 126. While the two collars 102 and 132 remain in these positions, which may be assured by tightening the set screws 122 and 142, the elongate rods 110 are extended so that their ends are co-planar with the face or surface of the brake spider 20 adjacent the apertures 36 and 38. Alternatively, measurement of the distance from the shoulder 20 to an undamaged feature of the brake spider 20 may be taken by any convenient means. All of the set screws 114 and 136 are then tightened. Next the fixture 100 may be removed by loosening the set screws 122 and 142 if they were tightened. It should be appreciated that an assortment of first and second collars 102 and 132 having circular apertures 104 and 134 of different diameters may be utilized to adapt the spider replacement fixture 100 to axles having various outside diameters of inner and outer bearing surfaces 24 and 26. Alternatively, an assortment of circular collars 52, illustrated in FIG. 2, having appropriate inside and outside diameters may be utilized to adapt the spider replacement fixture 100 to axles having various bearing diameters.

Then, as illustrated in FIGS. 4 and 5, the brake spider 20 is removed from the axle assembly 18 by any suitable means such as an oxy-acetylene torch 80 or other convenient and suitable method. As noted previously, a region 78 of the axle assembly 18 from which the brake spider 20 was removed may have burrs and irregularities which may be removed by grinding to ensure that the region 78 is generally circular and relatively smooth in order to facilitate installation of the replacement brake spider thereupon.

Figure 12:
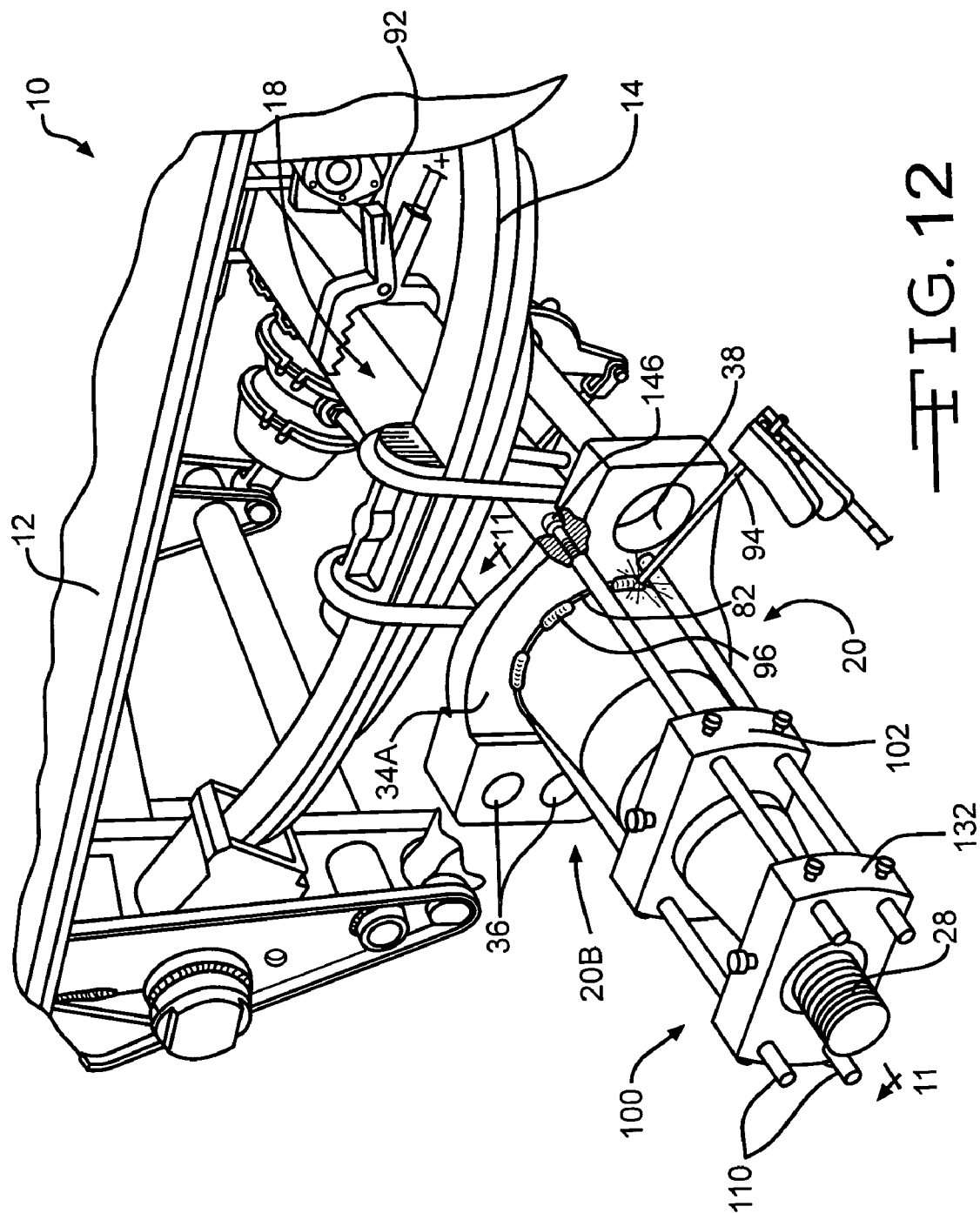
FIG. 12 is a fragmentary, perspective view of a vehicle (trailer) suspension illustrating a replacement brake spider disposed upon the vehicle axle with the preferred embodiment fixture according to the present invention.

Referring now to FIG. 12, a replacement brake spider 20B having a large, centrally disposed aperture 82 which fits over the axle assembly 14, an adjacent machined surface 34A and other suitable or necessary openings 36 and 38 will also include a pattern of four small holes, similar to the through apertures 84 illustrated in FIG. 7, which align accurately with the axes of the elongate rods 110 extending from the collars 102 and 134 of the spider replacement fixture 100. Prior to installation of the replacement spider 20B and the fixture 100 on the axle assembly 18, four small bolts or threaded fasteners 146, one of which is illustrated in FIG. 12, are installed to secure the replacement spider 20B to the distal ends of the elongate rods 110 against the machined surface 34A of the replacement spider 20A.

Then, the spider replacement fixture 100 and the replacement spider 20B are slid over the end of the axle assembly 18 until the front surface or face 106 of the first block or collar 102 contacts the shoulder 22. If necessary, the set screws 114 and 136 may be loosened and the elongate guides or rods 110 may be adjusted in order to locate the replacement spider 20B at the proper reference distance from the shoulder 22. The replacement spider 20B is then located properly rotationally about the axle assembly 18, the fixture 100 ensuring that the replacement spider 20B is maintained perpendicular to the axis of the axle assembly 18. Next, tack welds 96 are emplaced between the replacement spider 20B and the exterior of the axle assembly 18 by arc welding utilizing a suitably secured ground clamp 92 and a welding rod 94. Finally, the threaded fasteners 146 are removed, the spider replacement fixture 100 is removed and a continuous weld 98, preferably on both faces, between the replacement spider 20B and the axle assembly 18, as illustrated in FIG. 8, is completed.

It should be appreciated that while the foregoing description relates to the repair, through replacement, of a vehicle axle component, typically known as a brake spider or spider plate 20, the fixture and method are readily usable and adaptable for use in any circumstance where a generally flat, regular or irregular plate or flange must be secured perpendicularly to or adjacent a circular or cylindrical component such as a shaft, axle or similarly configured component. It should also be appreciated that the brake spider or regular or irregular plate or flange preferably includes features such as the plurality of small apertures 84 that facilitate attachment to the fixture 40 or 100 and a machined front surface 34A that is positioned normal to the axis of the axle assembly 18 to ensure proper orientation of the replacement spider assembly 20A or 20B. Moreover, the fixture and method may be utilized to install brake spiders that are different from the brake spiders 20 removed from the axle assembly 18 in conjunction with, for example, revising or upgrading the vehicle brakes to disc brakes.

The foregoing disclosure is the best mode devised by the inventor for practicing this invention. It is apparent, however, that methods incorporating modifications and variations will be obvious to one skilled in the art of fixtures and methods for replacing vehicle brake spiders. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A fixture for replacing brake spiders on vehicle axles comprising, in combination:
    a collar defining a first aperture sized to seat on an inner bearing surface of an axle;
    a member associated with said collar defining a second aperture sized to seat on an outer bearing surface of such axle;
    at least two elongate members associated with said collar, said members each having a distal end, said distal ends of said elongate members having an opening adapted to receive a fastener;
    means for maintaining said at least two elongate members parallel to one another, and
    means for adjustably securing said elongate members to said collar.

2. The fixture for replacing brake spiders of claim 1 wherein said member associated with said collar is a reduced diameter portion of said collar.

3. The fixture for replacing brake spiders of claim 1 wherein said member associated with said collar is a second collar.

4. The fixture for replacing brake spiders of claim 1 wherein said elongate members are two in number and are disposed on an outside surface of said collar.

5. The fixture for replacing brake spiders of claim 1 wherein said elongate members are four in number and are received within apertures in said collar.

6. The fixture for replacing brake spiders of claim 1 wherein said openings in said elongate members are threaded.

7. The fixture for replacing brake spiders of claim 1 wherein said means for adjustably securing said elongate members are set screws.

8. The fixture for replacing brake spiders of claim 1 further including a set screw aligned with said first aperture in said collar for securing said collar to such axle.

9. A fixture for replacing brake spiders on axles comprising, in combination:
    a cylindrical collar defining a first aperture sized to seat on an inner bearing surface of an axle and a second aperture sized to seat on an outer bearing surface of such axle;
    two elongate members associated with said collar, said elongate members each having an elongate slot and a distal end, said distal ends of said elongate members having at least one opening adapted to receive a fastener; and
    means extending through said elongate slots for selectively securing said elongate members to said cylindrical collar.

10. The fixture for replacing brake spiders of claim 9 wherein said elongate members are disposed on an outside surface of said cylindrical collar.

11. The fixture for replacing brake spiders of claim 9 wherein said openings in said elongate members are threaded.

12. The fixture for replacing brake spiders of claim 9 wherein said means for selectively securing said elongate members are set screws.

13. A fixture for replacing brake spiders on axles comprising, in combination:
    a first collar defining a first aperture sized to seat on an inner bearing surface of an axle;
    a second collar defining a second aperture sized to seat on an outer bearing surface of such axle;
    a plurality of parallel members extending between said collars, said members each having a distal end, said distal ends of said parallel members having an opening adapted to receive a fastener; and
    means for releaseably securing said parallel members to said first and second collars.

14. The fixture for replacing brake spiders on trailer axles of claim 13 wherein said parallel members are four in number and are received within apertures in said collars.

15. The fixture for replacing brake spiders on trailer axles of claim 13 wherein said means for releaseably securing said parallel members are set screws.

16. The fixture for replacing brake spiders on trailer axles of claim 13 including a set screw aligned with each of said apertures in said collars for securing said collar to such axle.

17. The fixture for replacing brake spiders on trailer axles of claim 1 wherein said means for maintaining said at least two elongate members parallel to one another includes an outer surface on said collar and surfaces on said elongate members conforming to said outer surface of said collar.

18. The fixture for replacing brake spiders on trailer axles of claim 1 further including a plurality of members, one of said members having a second aperture sized to seat on such outer bearing surface.

19. The fixture for replacing brake spiders on trailer axles of claim 9 wherein said two elongate members have surfaces complementary to an outside surface of said cylindrical collar.

20. The fixture for replacing brake spiders on trailer axles of claim 13 wherein said first and said second collars are a portion of a plurality of collars having apertures of different sizes.

* * * * *